J. T. McNALLY.
Bran-Dusters.
Reissued Dec. 22, 1874.
No. 6,183.
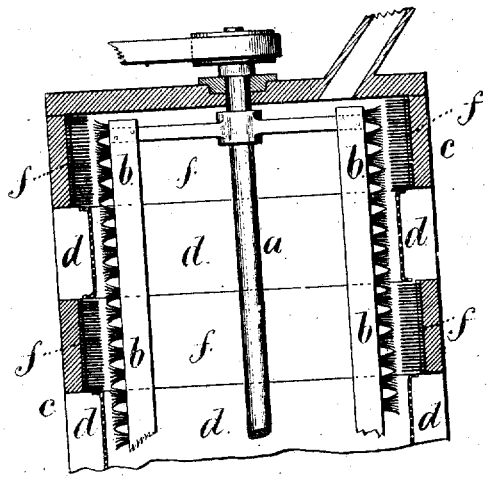
Witnesses
Chas. H. Smith
Geo. T. Pinckney
Inventor
John T. McNally.
per Lemuel W. Serrell
Atty.

UNITED STATES PATENT OFFICE.

JOHN T. McNALLY, OF BROOKLYN, NEW YORK.

IMPROVEMENT IN BRAN-DUSTERS.

Specification forming part of Letters Patent No. 137,228, dated March 25, 1873; reissue No. 6,183, dated December 22, 1874; application filed October 20, 1874.

*To all whom it may concern:*

Be it known that I, JOHN T. McNALLY, of Brooklyn, in the county of Kings and State of New York, have invented an Improvement in Bran-Dusters, of which the following is a specification:

Bran-dusters have been made with a vertical case having a fine screen near which revolved brushes that sweep the bran across the screen, and blow the flour through such screen. This screen is very liable to be injured, because the bran requires a rubbing action to loosen the flour, and if this is done against the screen there is considerable pressure and wear.

My invention is for loosening the flour and separating the same from the bran, so that the flour will be blown freely through the sieves or screens, and the bran will not be rubbed upon the screens to wear them out, but will be exposed to a rubbing or brushing action against a series of points composed of the wires in card-clothing upon the interior of the case of the duster. The points of these wires, acting as brushes, are very efficient in separating the particles of flour from the bran, and they are very strong and durable.

In the drawing, I have represented, by a partial vertical section, a bran-duster with my improvement applied thereto.

The shaft *a* and brushes *b* are of usual character, but they act in connection with card-clothing *f*, upon the inside of the case *c*. The points of this card-clothing serve to hold the hull while the brushes *b* operate, or to brush the material, as the same is brought into contact with the card-clothing by the brushes *b*.

The numerous points of the card-clothing render this machine very effective in removing any particles from the hull, and such clothing is very durable and cheap. The card-clothing can be secured within the case by any suitable means, and the strip or strips may run in any desired direction either around the case lengthwise or diagonally.

The fine particles that are removed are separated from the larger substances or bran. I have shown screens *a* that should be fine wire-cloth, and they are, preferably, placed at a little greater distance from the brushes *b* than the points of the card-clothing, and by alternating these screens with the card-clothing the fine particles of flour pass away rapidly as they are removed by the card-clothing from the hulls.

I do not claim card-clothing in machinery for hulling and scouring grain, nor a cylinder with card-clothing upon its exterior surface.

I claim as my invention—

1. The bran-dusting machine, having the closed portion of the cylindrical case covered with card-clothing, substantially as set forth.

2. The bran-dusting machine made with a case having a lining of card-clothing upon the inside, and a screen adjacent to such card-clothing, substantially as set forth.

Signed by me this 15th day of October, A. D. 1874.

JOHN T. McNALLY.

Witnesses:
GEO. T. PINCKNEY,
CHAS. H. SMITH.